W. Moore,
Steam-Boiler Water-Feeder,
N°82,974.                        Patented Oct. 13, 1868.
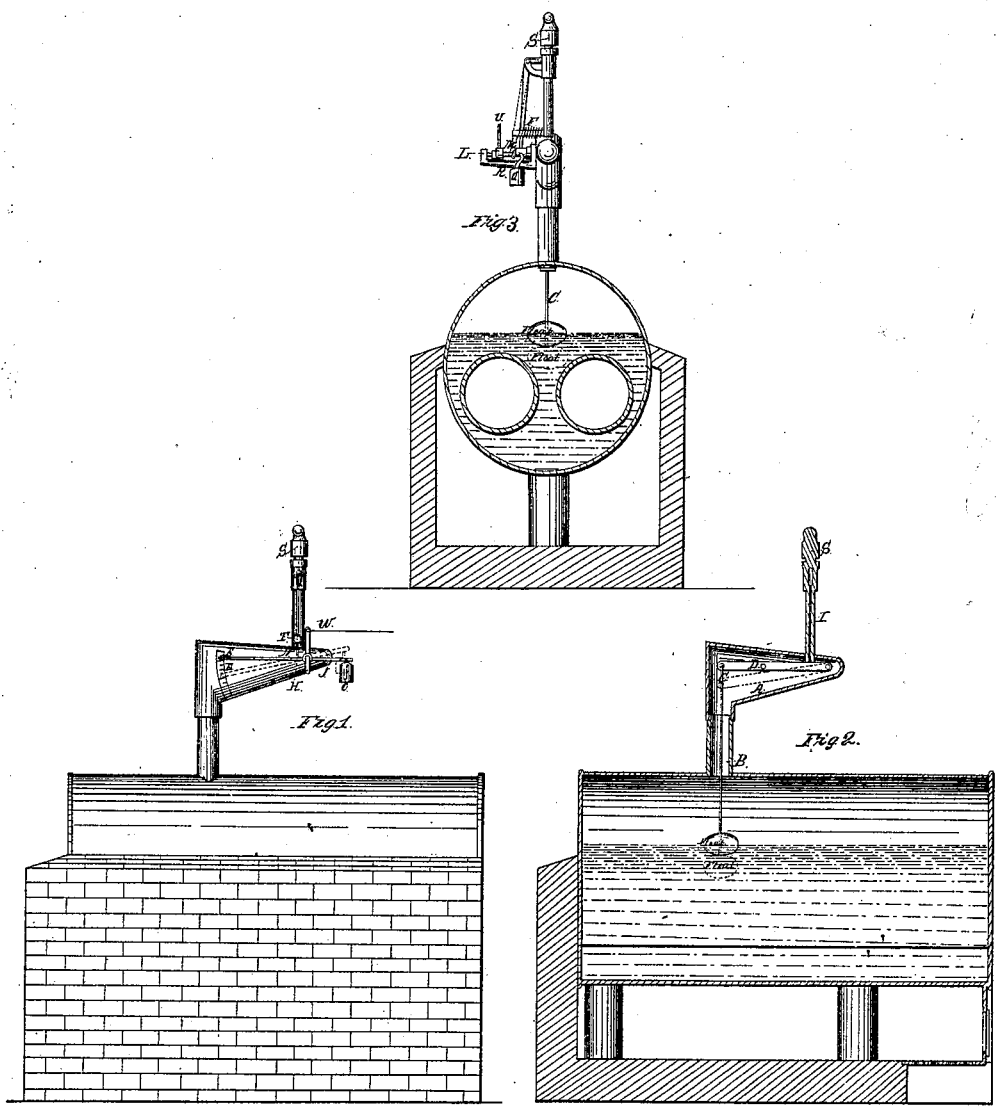
Witnesses:
Daniel Harris
Andrew Yount
Inventor:
William Moore

WILLIAM MOORE, OF KOKOMO, INDIANA.

Letters Patent No. 82,974, dated October 13, 1868.

IMPROVEMENT IN LOW-WATER INDICATORS.

The Schedule referred to in these Letters Patent and making part of the same.

*To all whom it may concern:*

Be it known that I, WILLIAM MOORE, of Kokomo, in the county of Howard, and State of Indiana, have invented a new and useful Improvement in Automatic Steam-Boiler Feeders; and I do hereby declare that the following is a full, clear, and exact description thereof, which will enable others skilled in the art to which it appertains to make and use the same, reference being had to the accompanying plates of drawings, which make a part of this specification.

Like letters in each of the figures denote corresponding parts.

Figure 1 is a side elevation;
Figure 2 is a longitudinal section; and
Figure 3, a cross-section.

This is specially intended to be an improvement on the patent granted to me, June 5, 1866, and numbered 55,338. In this I claim to have less friction, a sure indication to the eye of the amount of water in the boiler, and it is more easily applied to steam-boilers already in use; all which will readily appear by reference to the drawings.

I attach a steam-chamber, by means of a pipe, to the top of a boiler of any ordinary construction, or on the top of any auxiliary chamber attached thereto, by means of steam and water-pipes. Said chamber to be so constructed as to admit of a lever to vibrate up and down inside of it. One end of said lever to be connected by a rod passing through the pipe, connecting said chamber to the boiler. On the lower end of said rod is attached the float. The other or upper end of said rod to connect at a right angle with a shaft passing out of said chamber through a stuffing-box, as seen at M, fig. 3. Said shaft is then connected, by rod W, fig. 1, to the arrangement, as in my other patent referred to, for supplying water to the boiler.

In fig. 1 is shown an index-hand and scale to indicate the rising and falling of the water in the boiler.

At fig. 2 is shown the rod in two positions, inside the chamber, as operated by the float.

At fig. 3 is shown an arm, F, with a coiled spring on it, pressing against an alarm-lever, which causes an alarm by the whistle S when the water gets so low as to disengage the alarm-lever from behind said index-hand.

O, in figs. 1 and 3, is simply a balance to facilitate the operations of the float.

I do not claim the use of floats, worked automatically, as they have long been in use; but What I do claim, and desire to secure by Letters Patent, is—

The combination and arrangement of the chamber A, index-lever, and scale, with the water-regulator, all for the purposes and substantially as herein described and set forth.

In testimony whereof, I have hereunto subscribed my name in the presence of subscribing witnesses.

WILLIAM MOORE.

Witnesses:
JOHN W. COOPER,
LUNA WRIGHT.